(12) United States Patent
Yano (10) Patent No.: US 6,598,986 B2
(45) Date of Patent: Jul. 29, 2003

(54) ZOOM STROBE DEVICE

(75) Inventor: Takaaki Yano, Hokkaido (JP)

(73) Assignee: Pentax Corporation, Tokyo (JP)

( * ) Notice: Subject to any disclaimer, the term of this patent is extended or adjusted under 35 U.S.C. 154(b) by 0 days.

(21) Appl. No.: 10/067,743

(22) Filed: Feb. 8, 2002

(65) Prior Publication Data

US 2002/0149932 A1 Oct. 17, 2002

(30) Foreign Application Priority Data

Feb. 9, 2001 (JP) ........................................ 2001-033847

(51) Int. Cl.$^7$ ................................................ G03B 15/02
(52) U.S. Cl. .................... 362/18; 362/277; 359/366; 359/392; 359/795; 396/62; 396/175
(58) Field of Search ..................... 362/18, 277; 396/62, 396/175; 359/366, 795, 692

(56) References Cited

U.S. PATENT DOCUMENTS

| | | |
|---|---|---|
| 5,160,192 A | 11/1992 | Sugawara |
| 5,539,622 A | 7/1996 | Ishikawa |
| 5,772,302 A | 6/1998 | Ishikawa et al. |
| 6,179,447 B1 | 1/2001 | Ishikawa et al. |

*Primary Examiner*—Sandra O'Shea
*Assistant Examiner*—Ismael Negron
(74) *Attorney, Agent, or Firm*—Greenblum & Bernstein, P.L.C.

(57) ABSTRACT

A zoom strobe device is provided with a light emitting unit, which includes a light source and a reflector and a light collecting lens that collects the light emitted by the light emitting unit. The light emitting unit and the light collecting lens are movable relative to each other in a direction of an optical axis of the light collecting lens. The light collecting lens is configured such that a light emitting unit side surface has a positive power, and a surface opposite to the light emitting unit side surface (i.e., the object side surface) has a negative power. The light collecting lens has a positive power as a whole.

6 Claims, 7 Drawing Sheets

FIG.5E COMPARATIVE EXAMPLE 2

FIG.5F COMPARATIVE EXAMPLE 2

FIG.5C 1ST EMBODIMENT

FIG.5D 1ST EMBODIMENT

FIG.5A COMPARATIVE EXAMPLE 1

FIG.5B COMPARATIVE EXAMPLE 1

ZOOM STROBE DEVICE

BACKGROUND OF THE INVENTION

The present invention relates to a zoom strobe device for a zoom camera.

A zoom strobe device is generally configured such that a light emitting unit including a light source and a reflector is moved relative to a light collecting lens in order to vary an illumination angle. A zoom strobe device built-in the zoom camera is configured to vary the illuminating angle so as to conform with a photographing angle. The light collecting lens generally has a positive power. In a conventional zoom strobe device, the light collecting lens is designed such that each refractive surface thereof has a positive power, or one has a positive power and the other has no power.

The conventional light collecting lens is configured such that a light emitting unit side surface is a convex surface or the Fresnel surface. It should be noted that, if the light emitting unit side surface of the light collecting lens is formed as a convex surface, in order to obtain a sufficient thickness at the periphery of the lens, the thickness of the entire lens increases, which is not preferable.

Further, an object side surface of the light collecting lens is formed as a planar surface, a convex surface or a convex lenticular surface.

The object side surface of the collection lens is formed as the planar surface in view of design of the strobe device and/or the camera.

Alternatively, in view of the design of the strobe device and/or the camera, the object side surface of the collection lens may also be formed as a convex surface. This structure has an advantage in that, by forming the object side surface as the convex surface, a guide number at a tele extremity side (i.e., when the zoom lens is located at a tele extremity side and therefore the illumination angle is relatively small) can easily be increased. In addition, if the object side surface of the collection lens is formed to be the convex lenticular surface, the inside of the strobe device may be prevented from being seen from the outside.

It should be noted that the object side surface of the light collecting lens cannot be formed as the Fresnel surface. If the object side surface is formed as the Fresnel surface, particles of dust or the like may enter the grooves or stepped portions thereof, and an illumination distribution performance may be deteriorated or the dust particles may burn. Therefore, the object side surface is generally formed as a smooth surface.

Recently, zooming cameras having a relatively large zooming ratio (i.e., a ratio of the maximum focal lengths to the minimum focal length) are preferred. For such cameras, an illumination zooming ratio (i.e., a ratio of the maximum illumination angle to the minimum illumination angle) of the zoom strobe device is required. However, the conventional zoom strobe device as described above has disadvantages as follows.

1. If the illumination zooming ratio is large, the guide number at the tele extremity side does not increase sufficiently;
2. If the strobe device is optimized to provide a sufficient guide number at the tele extremity side, the guide number may not increase sufficiently at a wide extremity side, or light amount in a peripheral area within the illumination angular range at the wide extremity decreases greatly.

In particular, in a recent compact camera having a relatively large zooming ratio, an F number is relatively large, especially at the tele extremity side, and therefore the guide number at the tele extremity side should be made sufficiently large. Accordingly, the guide number of the strobe device at the tele extremity side should be made large. In such a case, however, in order to obtain the sufficient illumination intensity distribution characteristic at the wide extremity side, manufacturing cost may increase since the structure of the camera may be enlarged, a large capacity condenser may be used and/or another type of light source may be employed to improve the light intensity distribution. It should be noted that the lowered intensity of light at the peripheral area is problematic on the wide side where the illumination angle is large, and is not problematic on the telephoto side where the illumination angle is small.

SUMMARY OF THE INVENTION

The present invention provides a zoom strobe device whose illumination intensity distribution characteristic at the wide side is improved.

According to one embodiment of the invention, there is provided a zoom strobe device, which is provided with a light emitting unit including a light source and a reflector and a light collecting lens that collects the light emitted by the light emitting unit, the light emitting unit and the light collecting lens being movable relative to each other in a direction of an optical axis of the light collecting lens. The light collecting lens is configured such that a light emitting unit side surface has a positive power, and a surface opposite to the light emitting unit side surface (i.e., the object side surface) has a negative power. The light collecting lens has a positive power as a whole.

By employing a surface having a negative power on the object side surface, the illumination intensity distribution characteristic at the wide side is improved and further, sufficient guide numbers can be obtained at wide and tele extremities.

In one embodiment, the light emitting unit side surface may be formed with a Fresnel lens surface.

According to embodiments, the light source may include a rod-like light source, and the light collecting lens has a shape of substantially a rectangular parallelepiped. In this case, a longer side of the light collecting lens may extend in a direction parallel to an extending direction of the rod-like light source.

In a particular case, the surface opposite to the light emitting unit side surface may be formed as a concave surface which is rotationally symmetrical with respect to the optical axis of the light emitting unit.

Alternatively, a surface opposite to the light emitting unit side surface is formed as a cylindrical concave surface. In this case, the generatrix of the cylindrical surface is on a plane perpendicular to an optical axis of the light emitting unit, and is parallel to or perpendicular to an extending direction of the rod-like light source.

In a particular case, the strobe device may be configured to satisfy condition:

$$(Ha-Hb)/Ha<0.35,$$

wherein, Ha represents a height of the collecting lens, on the rod-like light source side, in a direction perpendicular to the central axis of the rod-like light source and the optical axis of the light emitting unit, and wherein Hb represents a length of an opening of the reflector on the collecting lens side, in the direction perpendicular to the central axis of the rod-like light source and the optical axis of the light emitting unit.

BRIEF DESCRIPTION OF THE EMBODIMENTS

DESCRIPTION OF EMBODIMENTS

Hereinafter, strobe devices according to embodiments of the present invention will be described with reference to the accompanying drawings.

First Embodiment

Figure 1:
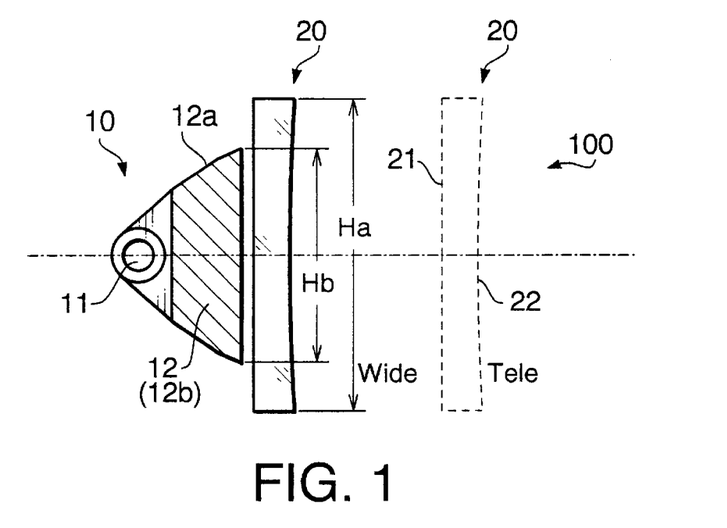
FIG. 1 schematically shows a side view of a strobe device according to a first embodiment of the invention.
Figure 2:
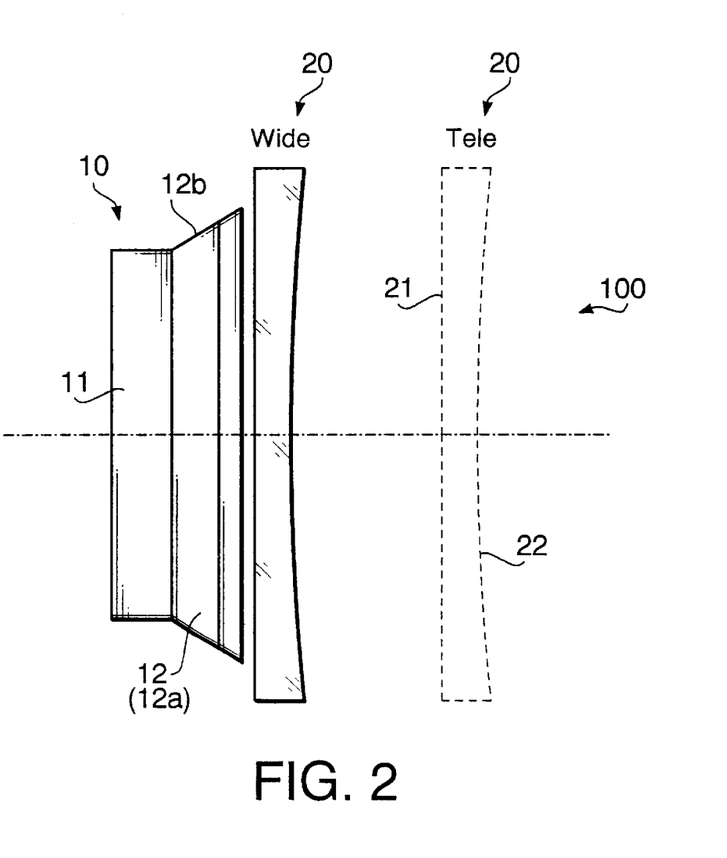
FIG. 2 is a plan view of the strobe device shown in FIG. 1.

FIG. 1 schematically shows a side view of a strobe device 100 according to a first embodiment of the invention. FIG. 2 is a plan view of the strobe device 100 shown in FIG. 1. The strobe device 100 includes a light emitting unit 10 and a light collecting lens 20. The light emitting unit 10 has a rod-like light source 11, which is a Xenon lamp in the embodiment, and a reflector 12.

The strobe device 100 is configured such that the light collecting lens 20 is movable relative to the light emitting unit 10. When the collecting lens 20 is located close to the light emitting unit 10 (indicated by solid lines in FIGS. 1 and 2), the illuminating angle is widened, while when the collecting lens 20 is apart from the light emitting unit 10 (indicated by broken lines in FIGS. 1 and 2), the illuminating angle decreases. Although the light collecting lens 20 is illustrated to be movable with respect to the light emitting unit 10 in FIGS. 1 and 2, the light source 20 may be practically configured to be movable, and the collecting lens 20 fixed to a camera body.

The reflector 12 has upper and lower reflecting surfaces 12a and side reflecting surfaces 12b. The upper and lower reflecting surfaces 12a are located above and below the rod-like light source 11, and extending in parallel with an elongated direction of the rod-like light source 11. As the upper and lower surfaces 12a for this kind of strobe device 12, a planar surface or a parabolic surface has been conventionally employed, and the strobe device according to the embodiment may employ such a surface.

The collecting lens 20 has a shape of a substantially thin rectangular parallelepiped. A light emitting unit side surface of the light collecting lens 20 is formed with a Fresnel 21 lens having a positive power. A surface of the collecting lens opposite to the light emitting unit side (i.e., a surface on an object side) is formed to be a concave surface 22 having a negative power.

According to the first embodiment, each of the Fresnel surface 21 and the concave surface 22 is rotationally symmetrical surface with respect to the optical axis of the light emitting unit 10. It should be noted that the optical axis of the light emitting unit 10 is defined as an axis that is perpendicular to the central axis of the rod-like light source 11 and extends at a center between the upper and lower reflection surfaces 12a on a plane evenly dividing the rod-like light source 10 in the extending direction thereof. The optical axis of the light emitting unit 10 intersects the center of the light collecting lens 20.

The zoom strobe device 100, which is provided with the rectangular collecting lens 20 according to the first embodiment, is configured to satisfy the following condition (1).

$$(Ha-Hb)/Ha<0.35 \quad (1)$$

where, Ha represents a height of the lens, on the rod-like light source side, in a direction perpendicular to the central axis of the rod-like light source 11 and the optical axis of the light emitting unit 10; and Hb represents a length of an opening of the reflector 12 at the collecting lens side, in the direction perpendicular to the central axis of the rod-like light source 11 and the optical axis of the light emitting unit 10.

It should be noted that, according to condition (1), a predetermined desired guide number can be obtained at the wide extremity, and further, the lowering of the light amount at the peripheral area within the illuminating range at the wide extremity can be sufficiently suppressed.

If the left term of condition (1) exceeds the upper limit, the power of the collecting lens is too strong and the object side surface of the lens should be formed as a concave surface. In such a case, the light intensity will not be well distributed on the wide extremity side.

Hereinafter, concrete examples of the embodiments will be described together with a comparative example.

TABLE 1 shows lens data of an example of the first embodiment, and first and second comparative examples. In these examples, the focal length of the collecting lens 20 is substantially the same. In the example of the first embodiment, the object side surface is formed as a concave surface. In the first comparative example, the object side surface is formed as a planar surface, and in the second comparative example, the object side surface is formed as a convex surface. The configuration of the light emitting unit 10 is the same for the three.

Figure 5A:
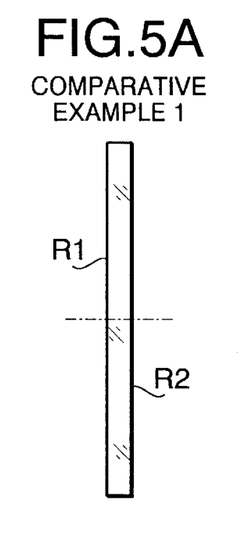
FIGS. 5A–5F show structures of light collecting lenses according to the first embodiment and comparative examples 1 and 2.
Figure 5B:
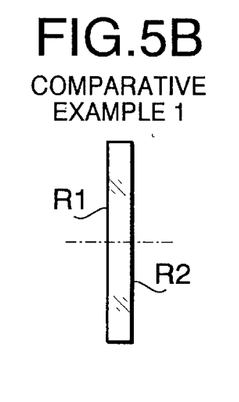
Figure 5C:
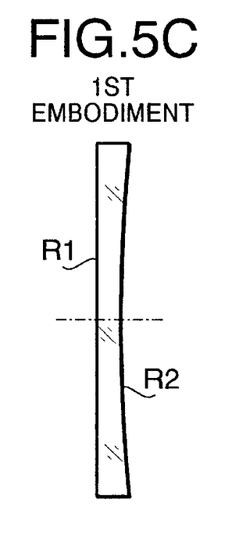
Figure 5D:
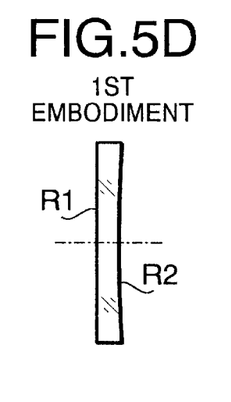
Figure 5E:
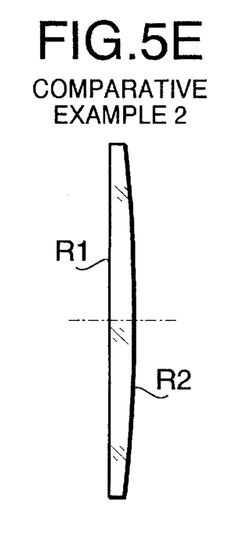
Figure 5F:
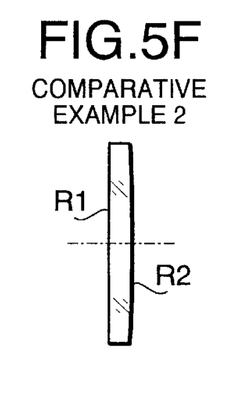
Figure 6:
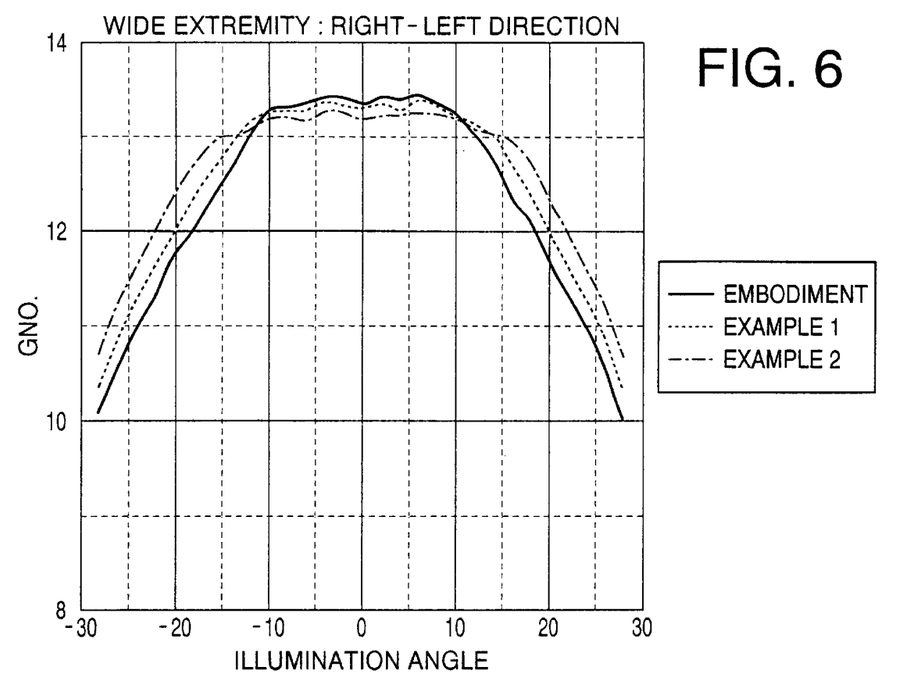
FIG. 6 is a graph illustrating light distribution characteristics in a right-and-left direction at a wide extremity represented by the guide number.
Figure 7:
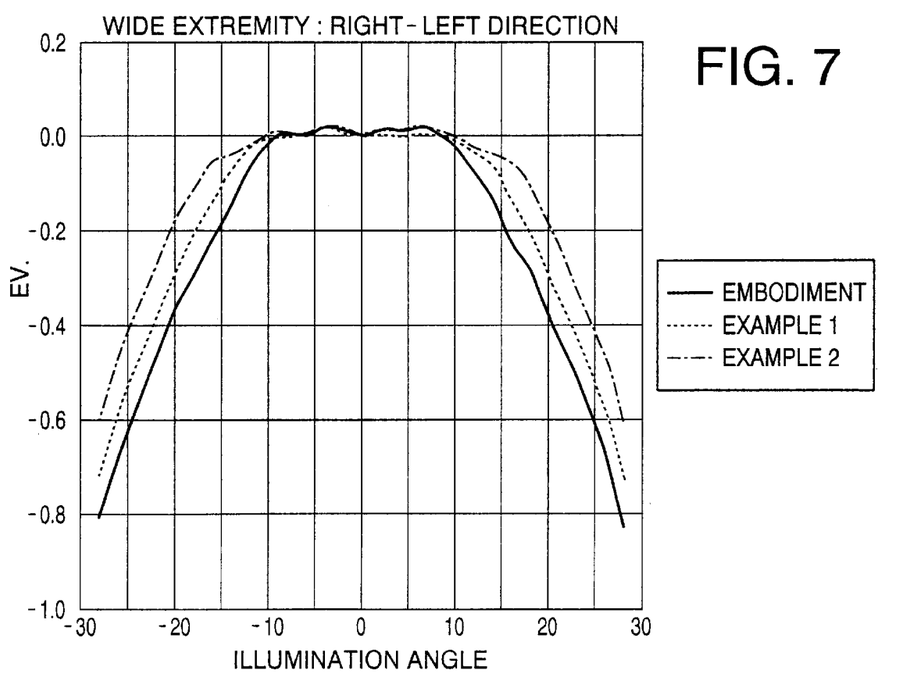
FIG. 7 is a graph illustrating light distribution characteristics in a right-and-left direction at a wide extremity represented by the EV value.
Figure 8:
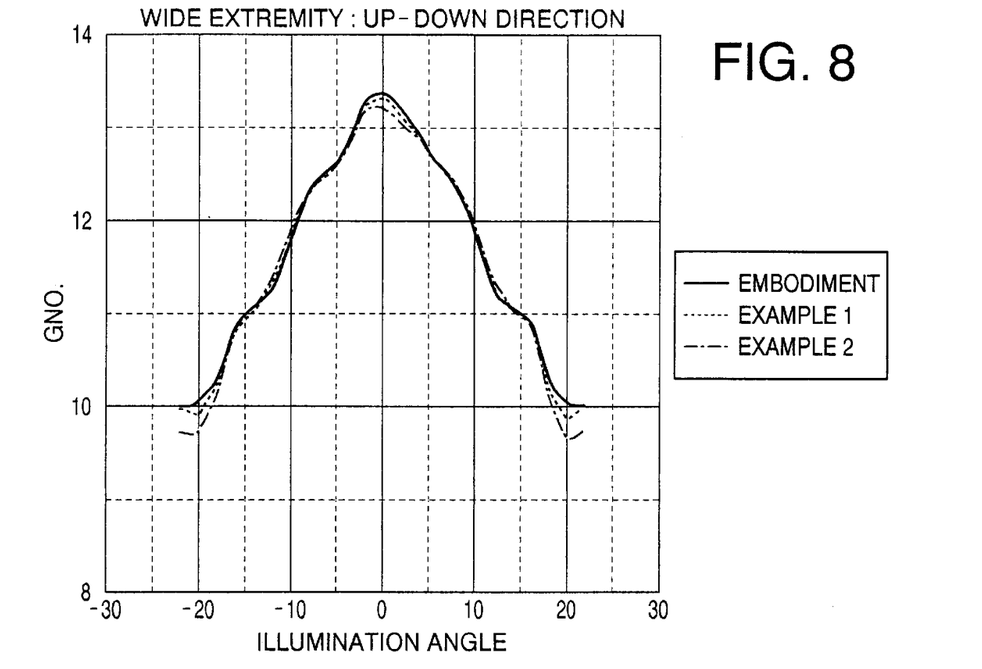
FIG. 8 is a graph illustrating light distribution characteristics in an up-and-down direction at a wide extremity represented by the guide number.
Figure 9:
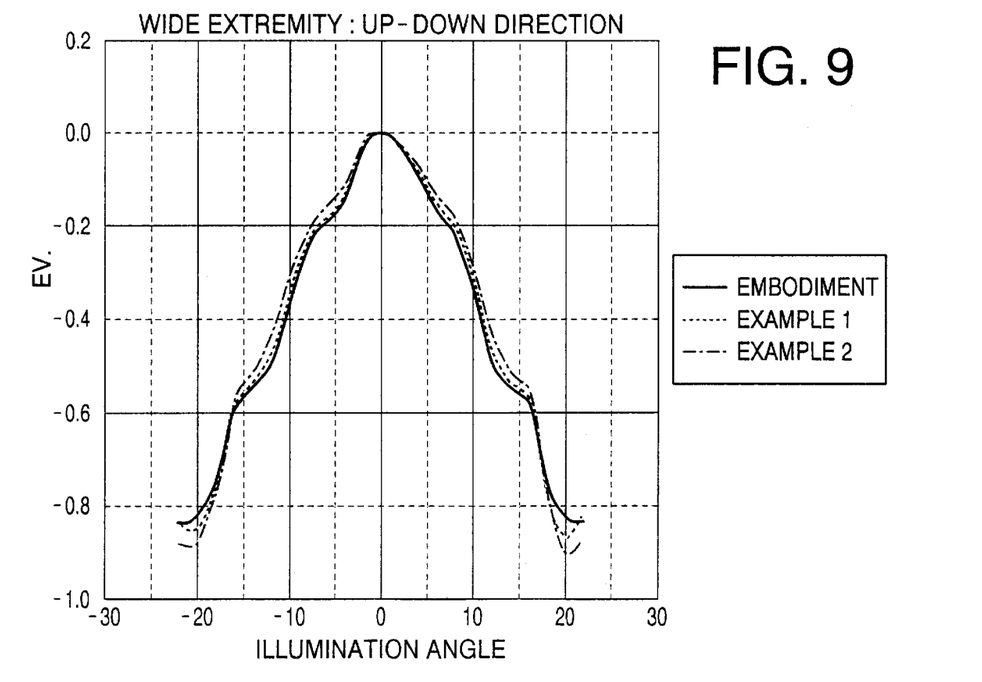
FIG. 9 is a graph illustrating light distribution characteristics in an up-and-down direction at a wide extremity represented by the EV value.
Figure 10:
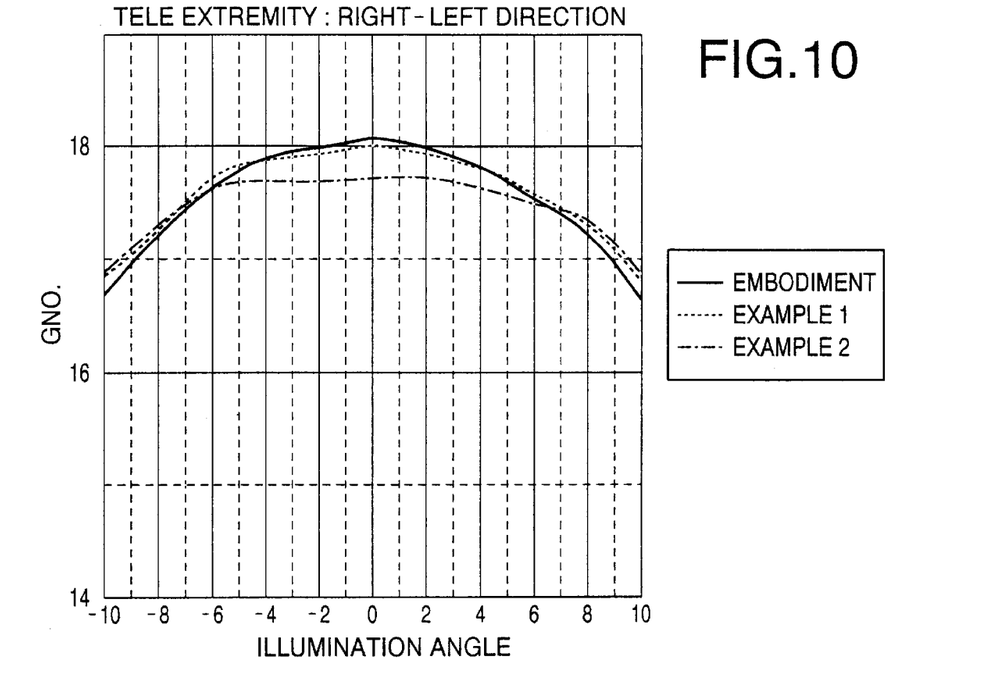
FIG. 10 is a graph illustrating light distribution characteristics in a right-and-left direction at a tele extremity represented by the guide number.
Figure 11:
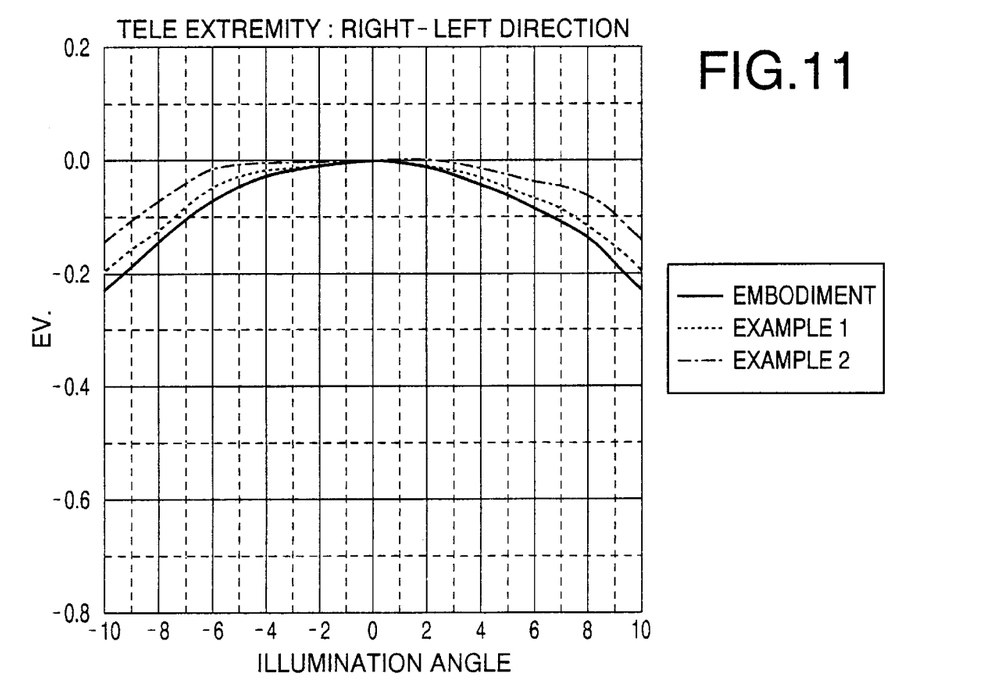
FIG. 11 is a graph illustrating light distribution characteristics in a right-and-left direction at a tele extremity represented by the EV value.
Figure 12:
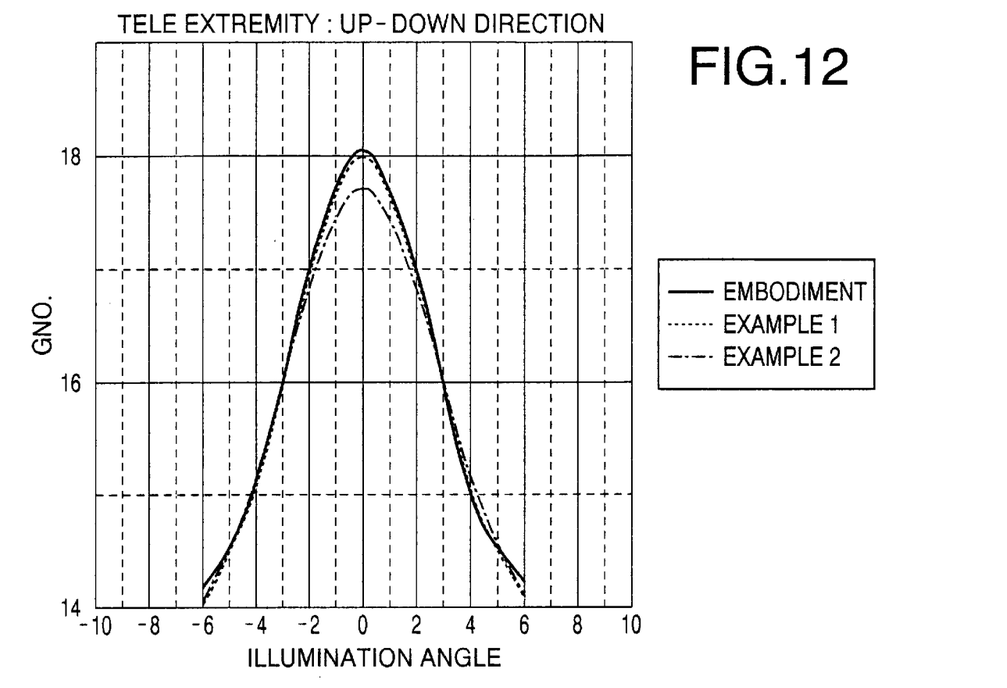
FIG. 12 is a graph illustrating light distribution characteristics in an up-and-down direction at a tele extremity represented by the guide number.
Figure 13:
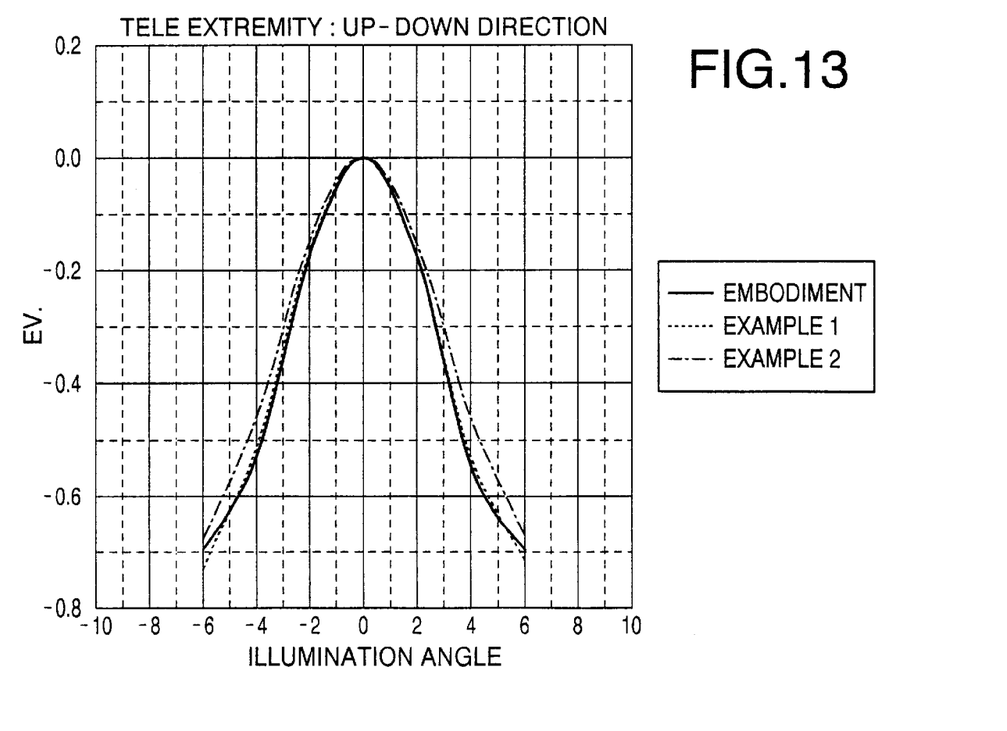
FIG. 13 is a graph illustrating light distribution characteristics in an up-and-down direction at a tele extremity represented by the EV value.

FIGS. 5A–5F show the shape of the lenses according to the example of the first embodiment (embd.) and the first and second comparative examples (ex. 1 and ex. 2). Specifically, FIGS. 5A and 5B are plan view and side view of the first comparative example of the light collecting lens; FIGS. 5C and 5D are plan view and side view of the light collecting lens 20 according to the first embodiment; and FIGS. 5E and 5F are plan view and side view of the second comparative example of the light collecting lens. In FIGS. 5A–5F and TABLE 1, surface R1 is the light emitting unit side surface, and surface R2 is the object side surface.

It is generally known that a rotationally symmetrical aspherical surface is expressed with the following polynomial.

$$x(y) = \frac{cy^2}{1 + \sqrt{1 - (1+K)c^2y^2}} + A4y^4 + A6y^6 + A8y^8 + A10y^{10} + A12y^{12} + \ldots \quad (1)$$

where, c represent a curvature (1/r), y represents a distance of a point on the aspherical surface with respect to the optical axis, K is a conical coefficient, A4, A6, A8, A12 . . . are aspherical coefficients for respective order terms. In the first embodiment and the comparative examples, only the conical coefficients have certain values (which are indicated in TABLE 1), and aspherical coefficients of respective order terms are zero.

TABLE 1

|  |  | embd. | ex. 1 | ex. 2 |
|---|---|---|---|---|
| surface R1 (Xe tube side) | shape | | Fresnel | |
| | r | 14.00 | 16.18 | 19.20 |
| | K | −1.20 | −1.20 | −1.20 |
| surface R2 (Object side) | shape | concave | planar | convex |
| | r | 100 | infinity | −100 |
| | K | −100 | 0 | −100 |
| focal length | | 32.78 | 32.77 | 32.76 |
| reflector shape | | | common | |

FIGS. 6–13 and TABLE 2 show the light intensity distribution of the fist embodiment and the comparative examples at wide and tele extremities, in the right-and-left direction (i.e., in the direction parallel with the extending direction of the rod-like light source 11) and up-and-down direction (i.e., in the direction perpendicular to the extending direction of the rod-like light source 11) using the guide number and EV values.

TABLE 2

|  |  |  |  | embd. | ex. 1 | ex. 2 |
|---|---|---|---|---|---|---|
| light intensity distribution characteristics | WIDE | Gno. | Center | 13.4 | 13.3 | 13.2 |
| | | Ev | R-and-L (28°) | −0.82 | −0.73 | −0.61 |
| | | | U-and-D (21°) | −0.83 | −0.85 | −0.61 |
| | TELE | Gno. | Center | 18.1 | 18.0 | 17.7 |
| | | Ev | R-and-L (9°) | −0.19 | −0.16 | −0.10 |
| | | | U-and-D (6°) | −0.70 | −0.72 | −0.68 |
| | | Hb | | | 8.87 | |
| | | Ha | | | 13.0 | |
| | | (Ha-Hb)/Ha | | | 0.32 | |

As shown in FIGS. 6, 8, 10 and 12, the embodiment achieves a higher guide number at the central area of a photographing frame both at wide and tele extremities. Further, as shown in FIGS. 7, 9, 11 and 13, within an angular range of approximately ±10 degrees, the illumination intensity distribution, especially at the wide extremity, of the first embodiment is substantially the same as that of the first or second comparative examples, although the guide number of the first embodiment is relatively high. Outside the angular range of ±10 degrees, the illumination intensity distribution of the first embodiment is slightly lower than the comparative examples. However, at the peripheral portion of the angular range of ±28 degrees, the characteristic of the first embodiment exhibits approximately −0.8 Ev, which is practically sufficient. The light intensity distribution of the first embodiment at the tele extremity is also sufficient in comparison with the comparative examples, regardless of the high guide number at the central area of the angular range.

Second Embodiment

In the strobe device 100 according to the first embodiment, the object side surface of the collecting lens is formed as a rotationally symmetrical concave surface. The invention is not limited to such a configuration, and various modifications may be obtained.

Figure 3:
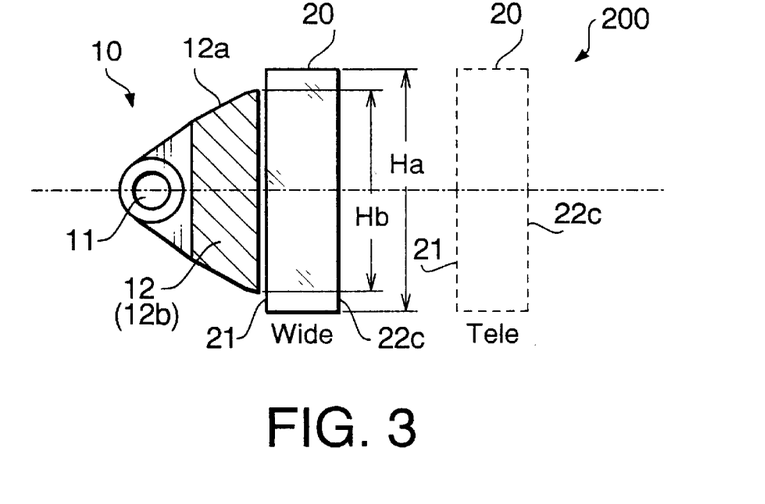
FIG. 3 schematically shows a side view of a strobe device according to a second embodiment of the invention.
Figure 4:
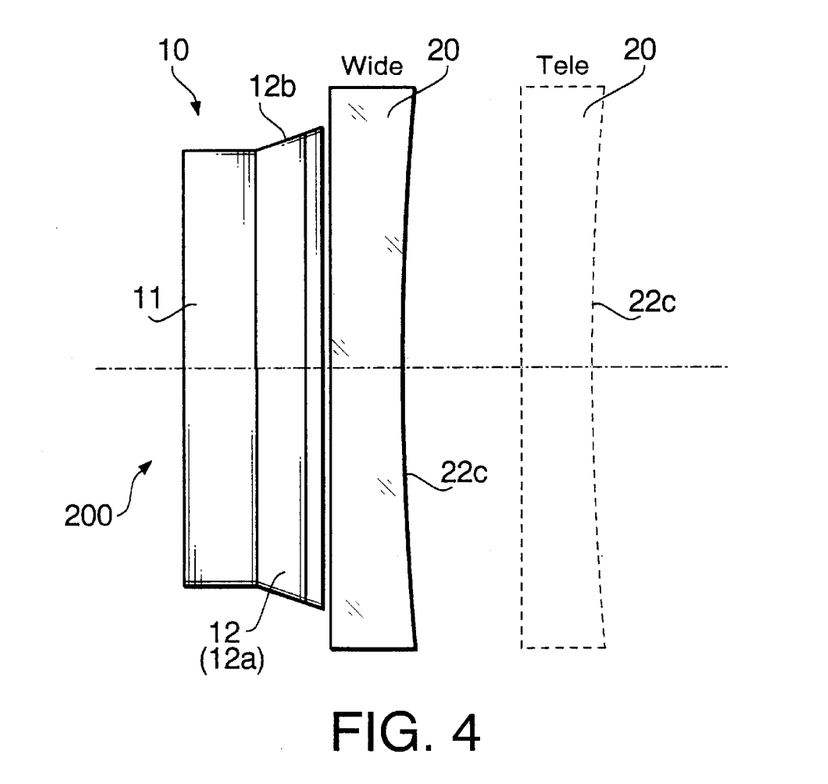
FIG. 4 is a plan view of the strobe device shown in FIG. 3.

FIG. 3 schematically shows a side view of a strobe device 200 according to a second embodiment of the invention, and FIG. 4 is a plan view of the strobe device 200. In the second embodiment, the object side surface 22C of the collecting lens 20 is formed as a cylindrical concave surface whose axis (i.e., generatrix) extends in a direction perpendicular to the central axis of the rod-like light source 11 and is perpendicular to the optical axis of the light emitting unit 10. As an alternative, the cylindrical concave surface may be configured such that the axis (i.e., generatrix) thereof extends in a direction parallel with the central axis of the rod-like light source 11.

In the zoom strobe device 200, light emitted by the rod-like light source 11 is incident on the collecting lens 20 directly or after reflected by the reflector 12. The collecting lens 20 has a positive power as a whole, and converges the incident light. Specifically, the incident light passes through a Fresnel surface 21 having a positive power, and then passes through a concave surface 22 (i.e., a cylindrical surface 22C). Due to effect of the concave surface 22, a desired guide number especially at the wide extremity is achieved, thereby a sufficient amount of peripheral light intensity can be obtained. That is, by employing the cylindrical surface 22C, the light intensity distribution can be improved. The power of the concave surface 22 or the cylindrical concave surface 22C (i.e., a radius of curvature thereof) may be determined so that sufficient guide numbers at the tele extremity and the wide extremity can be obtained with taking into account the positive power of the Fresnel surface 21.

It should be noted that condition (1) should also be satisfied in the second embodiment to achieve the sufficient light intensity distribution at the wide extremity.

According to the zoom strobe devices as described above, the guide number is increased especially at the wide extremity, and the light intensity distribution can be improved in comparison with the conventional zoom strobe device.

The present disclosure relates to the subject matter contained in Japanese Patent Application No. 2001-033847, filed on Feb. 9, 2001, which is expressly incorporated herein by reference in its entirety.

What is claimed is:

1. A zoom strobe device, comprising:
   a light emitting unit including a light source and a reflector;
   a light collecting lens that collects the light emitted by said light emitting unit, said light emitting unit and said light collecting lens being movable relative to each other in a direction of an optical axis of said light collecting lens, said light collecting lens being configured such that a light emitting unit side surface has a positive power, a surface opposite to the light emitting unit side surface has a negative power, and has a positive power as a whole.

2. The zoom strobe device according to claim 1, wherein the light emitting unit side surface is formed with a Fresnel lens surface.

3. The zoom strobe device according to claim 1, wherein said light source comprises a rod-like light source, and wherein said light collecting lens comprises a shape of substantially a rectangular parallelepiped, longer side of which extends in a direction parallel to an extending direction of said rod-like light source.

4. The zoom strobe device according to claim 1, wherein said surface opposite to the light emitting unit side surface is formed as a concave surface which is rotationally symmetrical with respect to the optical axis of said light emitting unit.

5. The zoom strobe device according to claim 3, wherein said surface opposite to the light emitting unit side surface is formed as a cylindrical concave surface whose generatrix is on a plane perpendicular to an optical axis of said light emitting unit and is one of parallel to and perpendicular to an extending direction of said rod-like light source.

6. The zoom strobe device according to claim 3, satisfying condition:

$$(Ha-Hb)/Ha < 0.35,$$

wherein, Ha represents a height of said collecting lens, on the rod-like light source side, in a direction perpendicular to the central axis of the rod-like light source and the optical axis of the light emitting unit, and wherein Hb represents a length of an opening of the reflector on the collecting lens side, in the direction perpendicular to the central axis of the rod-like light source and the optical axis of the light emitting unit.

* * * * *